(12) United States Patent
Sethuraman

(10) Patent No.: US 10,979,120 B2
(45) Date of Patent: Apr. 13, 2021

(54) METHOD FOR OPTIMIZING CHANNEL SOUNDING FEEDBACK IN MIMO SYSTEMS

(71) Applicant: Cypress Semiconductor Corporation, San Jose, CA (US)

(72) Inventor: Prasanna Kumar Sethuraman, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/707,969

(22) Filed: Dec. 9, 2019

(65) Prior Publication Data

US 2020/0382192 A1 Dec. 3, 2020

Related U.S. Application Data

(60) Provisional application No. 62/854,441, filed on May 30, 2019.

(51) Int. Cl.
| | | |
|---|---|---|
| H04B 7/06 | (2006.01) | |
| H04L 5/00 | (2006.01) | |
| H04B 7/0413 | (2017.01) | |

(52) U.S. Cl.
CPC ......... *H04B 7/0626* (2013.01); *H04B 7/0413* (2013.01); *H04B 7/0617* (2013.01); *H04L 5/0048* (2013.01)

(58) Field of Classification Search
CPC ... H04B 7/0619; H04B 7/0658; H04B 7/0663
See application file for complete search history.

(56) References Cited

U.S. PATENT DOCUMENTS

| | | |
|---|---|---|
| 8,532,214 B2 | 9/2013 | Cheng |
| 8,923,110 B2 | 12/2014 | Cheng et al. |
| 8,929,473 B2 | 1/2015 | Ayach et al. |
| 9,031,141 B2 | 5/2015 | Hadani et al. |

(Continued)

FOREIGN PATENT DOCUMENTS

| | | |
|---|---|---|
| AU | 2017210619 B2 | 10/2019 |
| CN | 107483091 A | 12/2017 |

(Continued)

OTHER PUBLICATIONS

US 8,761,315 B1, 06/2014, Vojcic (withdrawn)

(Continued)

*Primary Examiner* — Kevin Kim

(57) ABSTRACT

Implementations disclosed describe systems and methods to optimize delivery of channel state information in wireless networks. In one implementation, a beamformee device may comprise a plurality of antennas, to receive radio frequency signals, a radio circuit coupled to the plurality of antennas, the radio circuit to generate strength indicators of the received radio frequency signals, and a processor to determine, based on the strength indicators, a first set of feedback parameters characterizing signal transmission received by each of the plurality of antennas, generate a sparse set of feedback parameters from the first set of feedback parameters, generate a second set of feedback parameters with elements of the sparse set that exceed a threshold value, and cause the radio circuit to transmit the second set of feedback parameters.

20 Claims, 7 Drawing Sheets

(56) References Cited

U.S. PATENT DOCUMENTS

| | | | |
|---|---|---|---|
| 10,298,305 B2 | 5/2019 | Lau et al. | |
| 10,326,524 B2 | 6/2019 | Jungnickel et al. | |
| 10,411,783 B2 | 9/2019 | Taherzadehboroujeni et al. | |
| 10,444,766 B2 | 10/2019 | Shattil | |
| 2013/0163645 A1 | 6/2013 | Kuo et al. | |
| 2016/0094318 A1 | 3/2016 | Shattil | |
| 2017/0163327 A1 | 6/2017 | Yang et al. | |
| 2017/0195934 A1 | 7/2017 | Kang et al. | |
| 2018/0041257 A1* | 2/2018 | Chen | H04B 7/024 |
| 2018/0267131 A1 | 9/2018 | Simileysky | |
| 2020/0212984 A1* | 7/2020 | Fellhauer | H04B 7/0663 |

FOREIGN PATENT DOCUMENTS

| | | |
|---|---|---|
| WO | 2018027994 A1 | 2/2018 |
| WO | 2019171141 A2 | 9/2019 |

OTHER PUBLICATIONS

Qi Wang, "Sparse Coding Quantizatization for Downlink MU-MIMO With Limited CSI Feedback" 2013 IEEE Military Communication Conference.

International Search Report for International Application No. PCT/US2020/033046 dated Jul. 28, 2020; 3 pages.

Murakami et al. "A Receiving Antenna Allocation Scheme for Downlink MU-MIMO-OFDM Transmission," Electronics 2018, 7, 129 Jul. 26, 2018 [retrieved on Jul. 15, 2020] Retrieved from the Internet: URL: https://www.mdpi.com/2079-9292/7/8/129/pdf pp. 1-12.

Written Opinion of the International Searching Authority for International Application No. PCT/US2020/033046 dated Jul. 28, 2020; 12 pages.

* cited by examiner

METHOD FOR OPTIMIZING CHANNEL SOUNDING FEEDBACK IN MIMO SYSTEMS

RELATED APPLICATIONS

This application claims the benefit and priority of U.S. Provisional Application No. 62/854,441, filed May 30, 2019, the entire contents of which are incorporated herein by reference.

TECHNICAL FIELD

The disclosure pertains to wireless networks, more specifically to improving throughput rates in systems with multiple input-output antennas.

BACKGROUND

Wireless networks increasingly use multiple-input multiple-output (MIMO) radio channels between an access point and a client device. Multiple transmitting and receiving antennas allow multipath propagation based on beamforming, in which constructive and destructive interference of radio waves is used to enhance simultaneous signal transmission between the access point and various client devices. Because an environment of a wireless network is often dynamic, the access point may have to periodically probe the environment by initiating a channel sounding procedure during which a set of sounding signals is output by multiple antennas of the access point device and received by multiple antennas of various client devices. The client devices may then communicate back to the access point the channel state information extracted from the received signals. Equipped with this feedback, the access point may perform optimized beamforming, which is tailored for each client device given the contemporaneous conditions of the wireless network environment. With a large number of client devices, each equipped with multiple antennas, the amount of channel sounding feedback that has to be provided to the access point may become quite significant and take a substantial amount of time. This may leave significantly less time, than would be optimal, for the actual data transmission.

DETAILED DESCRIPTION

Figure 1:
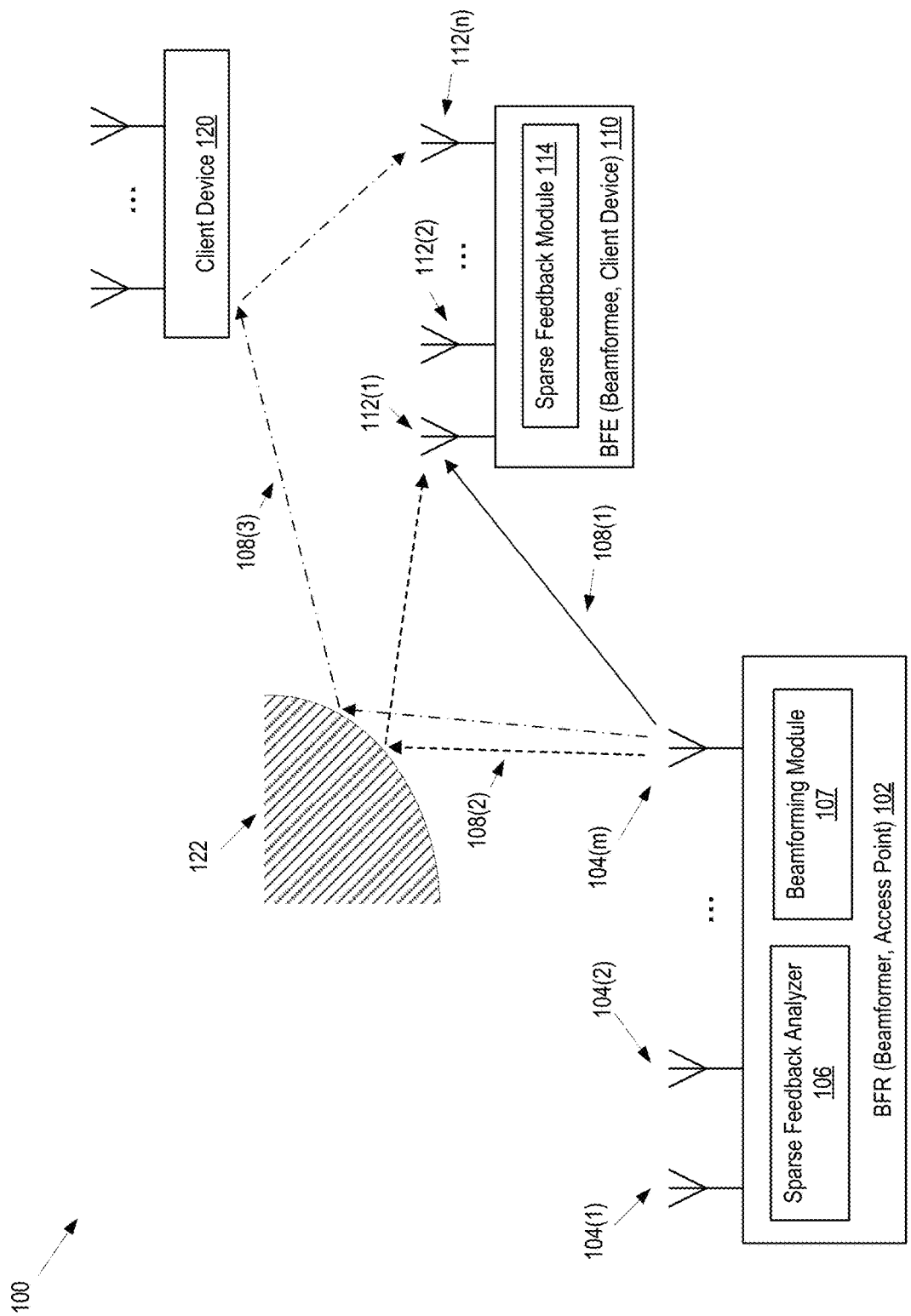
FIG. 1 illustrates one exemplary implementation of a wireless network that uses a MIMO channel to support wireless connection between a base station and multiple client devices.

Aspects of the present disclosure are directed to optimizing processing of sounding feedback and its delivery to the access point by transforming the sounding feedback from a representation in which the sounding feedback is characterized by a large number of non-zero values to another representation—a sparse representation—in which the number of non-zero values is significantly reduced. Consequently, only the non-zero values may be communicated to the access point. The access point, equipped with an additional functionality that allows extraction of the sounding feedback based on the sparse representation, may be capable of accomplishing efficient beamforming, for one or more client devices, upon dedicating only a fraction of its overall throughput to the channel sounding process.

Modern wireless network environments often provide wireless connectivity to a large number of client devices (users, stations) using wireless local area networks (WLANs), such as the WiFi® networks, in one implementation. A wireless network may be located in a public place (a store, an airport, a passenger plane or bus) or in a private place (a home, an automotive environment, such as a passenger car, a sport-utility vehicle, and the like). Client devices may include laptops, tablets, smart phones, headrest screens, and the like. The wireless networks may include devices equipped with multiple antennas and capable of using MIMO channels for data transmission.

In a crowded environment of a typical wireless network, a line-of-sight radio transmission is rarely available as radio waves experience reflection from various obstacles (such as users, walls, furniture, car seats, and so on) resulting in rather complicated interference/diffraction patterns of the radio waves. This complexity may be turned to an advantage. The access point—the beamformer (BFR)—may tailor signal output by its various antennas in order to achieve selective directional enhancement of transmission of intended data packets towards a particular target client device while similarly enhancing radio transmission of other data packets intended for other client devices. This may allow efficient simultaneous transmission of information to multiple client devices.

Because the wireless environment may be constantly changing, the BFR may need to perform periodic probing of the environment—channel sounding—by sending sounding signals to the client devices. Each client device—beamformee (BFE)—may return indications of the strengths of the received signals (the sounding feedback) to the BFR. The sounding feedback may include feedback parameters that characterize signal transmission between various antennas of BFR and various antennas of BFE. For the orthogonal frequency-division multiplexing (OFDM) used in modern wireless systems such as WiFi and LTE, the feedback parameters may need to be sent for multiple frequency subcarriers (herein also referred to as "tones") of the radio band used for the wireless communication. The number of such tones may depend on the specific protocols used. For example, in the IEEE 802.11ac VHT (Very High Throughput) standard, a 20 MHz channel may have 52 tones, a 40 MHz channel may have 108 tones, an 80 MHz channel may have 234 tones, a 160 MHz channel may have 468 tones, and so on. In the IEEE 802.11ax HEW (High-Efficiency Wireless) standard, the number of tones (and the resulting amount of feedback to be sent to BFR) is even greater: 208 for a 20 MHz channel, 432 for a 40 MHz channel, 936 for a 80 MHz channel, 1872 for a 160 MHz channel, and so on. In case of 8 BFR antennas and 2 BFE antennas (16 spatial streams), operating in a 80 MHz 802.11ax channel and requiring 4 bits to transmit a feedback data per tone and per spatial stream, there are 16×936×4=59904 feedback bits to be transmitted to BFR during one channel sounding session. At a rate of transmission of 24 Mbps, it may take 2.5 ms to send this amount of feedback. If the channel sounding is repeated every 25 ms, about 20% of the total air time may be spent on feedback transmission.

The implementations described herein overcome the challenges and problems set forth above. More specifically, the implementations disclosed optimize channel sounding feedback transmission, by reformatting feedback parameters to a sparse representation, in which a share of non-zero elements is significantly reduced, and transmitting to BFR only non-zero elements (or only the elements that exceed a certain threshold value). This increases the overall throughput of the network and improves wireless connectivity for each of the client devices of the network. Additionally, the reduction of the amount of feedback sent to the BFR improved power consumption by the BFE.

FIG. 1 illustrates one exemplary implementation of a wireless network 100 that uses a MIMO channel to support wireless connection between a base station and multiple client devices. The wireless network 100 may be a wireless local area network (WLAN), in one implementation, and may include a base station, also referred herein as the access point, base station, and/or beamformer BFR 102. The base station BFR 102 may be equipped with multiple antennas 104(1) . . . 104($m$) that may transmit and receive radio signals within a working frequency range (band). The frequency range may be a 2.4 GHz range, a 5 GHz, or the 60 GHz range, or any other range that may be used for wireless MIMO networking.

The BFR 102 may transmit output radio signals that may follow a plurality of paths, such as paths 108(1), 108(2), and 108(3), in one illustrative example. The paths 108 may be received by a client device, also referred herein as beamformee BFE 110, via one or more BFE antennas 112(1) . . . 112($n$). Some of the paths 108 may go directly (along a line-of-sight path) between two antennas, as, for example, does the path 108(1) that connects the BFR antenna 104($m$) and the BFE antenna 112(1). Other paths may contain reflections from various bodies, such as other client devices 120, obstacles 122, and so on. For brevity and conciseness, only a few paths connecting one of the BFR antennas and one of the BFE antennas are depicted in FIG. 1, but radio signal propagation may include numerous other paths, including infinite continua of paths connecting other antennas. The BFR antennas 104 are depicted as transmitting antennas whereas the BFE antennas 112 are depicted as receiving antennas. Such arrangement may be used, for example, when the BFR antennas 104 are transmitting data or sounding signals to the BFE 110. In some instances, the BFE antennas 112 may operate as transmitting antennas whereas the BFR antennas 104 may operate as receiving antennas. This arrangement may be used, for example, when the BFE 110 is communicating sounding feedback or other data to the BFR 102.

The client device BFE 110 may have a sparse feedback module (SFM) 114 operating according to implementations of this disclosure. The SFM 114 may obtain the indicators of strengths of the sounding signals received by the BFE antennas 112 and determine the feedback parameters that characterize the MIMO channel of the network 100. The SFM 114 may transform the determined feedback parameters into a sparse representation, as explained in more detail below in reference to FIG. 2, discard zero (or sufficiently small) elements of the sparse representation, and output the remaining elements via the BFE antennas 112 to the BFR 102. The BFR 102 may have a sparse feedback analyzer (SFA) 106 to retrieve the received (via one or more antennas 104) sparse representation and transform it into a form accessible to a beamforming module 107. Such transformation may include application of an appropriate reverse transformation to the sparse representation to extract channel sounding feedback parameters, in some implementations.

The beamforming module 107 may determine, based on the extracted feedback parameters, beamforming settings for each or some of the BFR antennas 104. The beamforming module 107 may use the beamforming settings to prepare and output, to each or some of the BFR antennas 104, a data signal to be transmitted to the BFE 110. In some implementations, the beamforming module 107 may be a conventional software and/or hardware module operating in accordance with the appropriate wireless transmission standard (e.g., IEEE 802.11ac or IEEE 802.11ax). In such implementations, the additional sparse feedback functionality may be added via a separate SFA 106 implemented in software, hardware, and/or firmware. In other implementations, the SFA 106 and the beamforming module 107 may be integrated into a single sparse feedback component that may be implemented on the same die. This die may also host the central processing unit (CPU) and/or other components and modules of the BFR 102.

In some implementations, the role of a BFR and a BFE may be reversed in some instances. For example, prior to uploading data from the client device 110, the client device 110 may transmit sounding signals to test the wireless connection between the antennas 112 (now operating in the transmission regime) and the antennas 104 (now operating as receiving antennas). In return, the base station 102 may determine the strength of the received sounding signals, compute the feedback parameters, and transmit the computed feedback parameters to the client device 110. To facilitate such reverse channel sounding, the base station 102 may have an additional sparse feedback module (not shown) while the client device 110 may have and additional sparse feedback analyzer (also not shown). In some implementations, the sparse feedback module and the sparse feedback analyzer of the BFR 102 (and, correspondingly of the BFE 110) may be implemented as a single sparse feedback component that combines the direct and the reverse channel sounding functionalities.

Other client devices of the wireless network 100, such as the client device 120, may have similar (or identical) sparse feedback modules/analyzers, to facilitate beamforming and data transmission to and from the BFR 102 and/or other such client devices, e.g., the client device 110. In some implementations, the BFR 102 may output a single set of sounding signals intended to be received by multiple client devices. Subsequently, various client devices may transmit back to the BFR 102 their respective sets of (sparse) feedback parameters in a staggered in time multiplexed fashion. For example, the client device 110 may transmit its feedback parameters first, followed by a transmission from the client device 120, and so on. In some implementations, the BFR 102 may be a dual-band access point supporting wireless connectivity over two (or more) frequency bands, such as 5 GHz and 2.4 GHz (or any other possible frequency range), with some of the client devices using a first band and some of the client devices using a second (or other) band(s). In such implementations, two (or more) client devices operating on different bands may be capable of transmitting sounding feedback information to BFR 102 simultaneously.

The wireless network 100 may be implemented in any private or public environment that may benefit from channel-sounding functionality. Such environments may include wireless networks in passenger airplanes, trains, ships, or any other transportation and/or automotive environments. The wireless network 100 may also be implemented outside transportation environments, for example, in hotels, at conferences, and so on.

Figure 2:
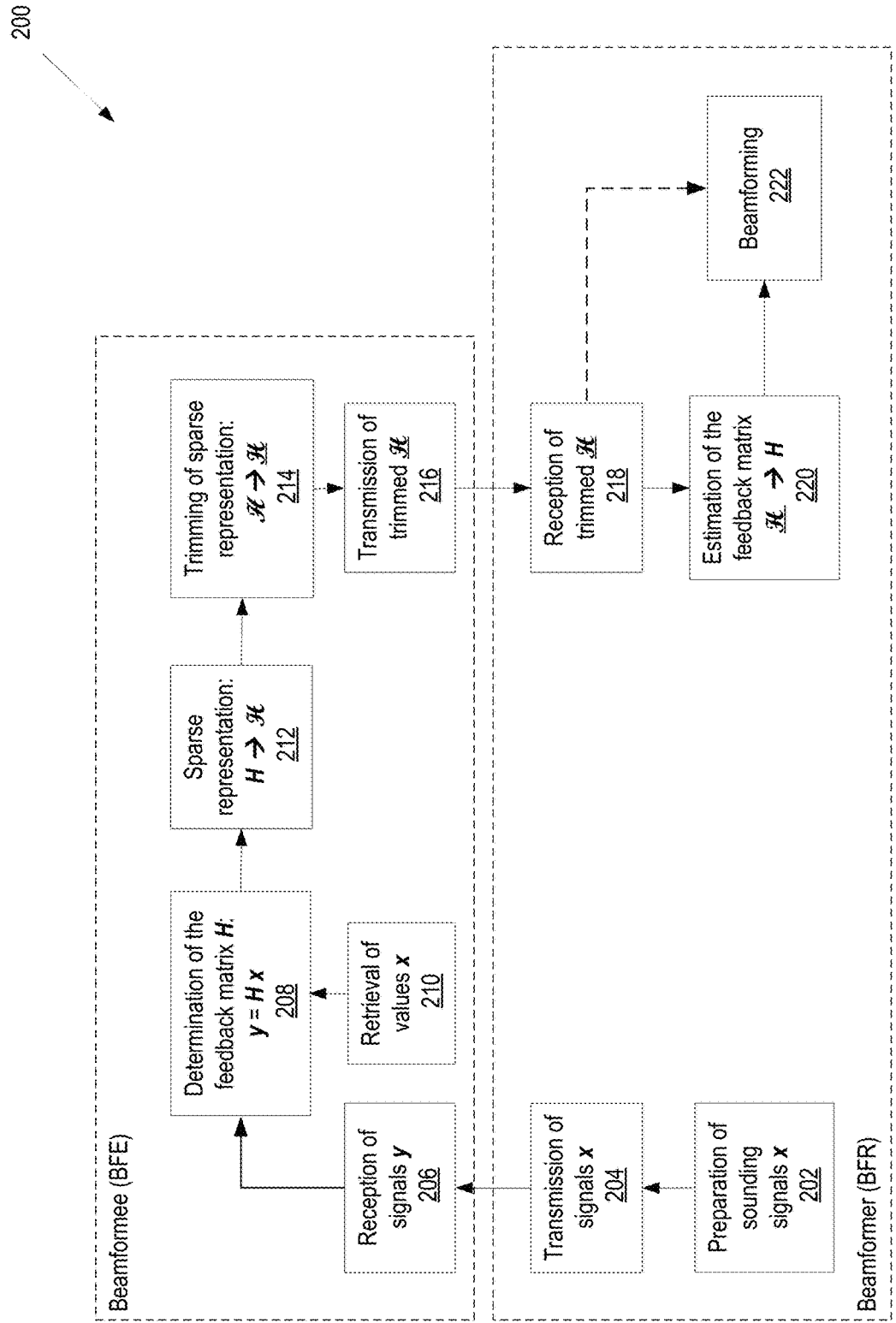
FIG. 2 illustrates one possible example of generation, delivery, and usage of the optimized channel-sounding feedback, in one possible implementation.

FIG. 2 illustrates one possible example 200 of generation, delivery, and usage of the optimized channel-sounding feedback, in one possible implementation. The sparse feedback module 114 of the beamformee device 110 and/or the sparse feedback analyzer 106 of the BFR 102 may perform various operations illustrated in FIG. 2. At the outset of the channel sounding session, the BFR 102 may prepare (box 202) a set (vector) of sounding signals x for some or all of the BFR antennas 104(1) . . . 104(m). The m components $x_k$ of the vector $x=(x_1, x_2, \ldots x_m)$ may characterize sounding signals that are to be output by the respective BFR antenna 104(j). The components $x_k$ may be real numbers representative of amplitudes of the signals to be output, in some implementations. In other implementations, the components $x_j$ may be complex numbers representative of both the amplitudes and phases of the signals to be output.

The prepared signals x may be transmitted by the BFR antennas 104 to the BFE 110 (box 204). The BFR antennas 104 may receive the transmitted signals (box 206) and a radio circuit (e.g., radio frequency (RF) transceiver) of the BFE 110 may determine the strengths (and, in some implementation, phases) of the received signals and output indicators of the strengths to the CPU of the BFE 110. The indicators may have a form of a vector $y=(y_1, y_2, \ldots y_n)$ whose n components $y_j$ (real or complex), may characterize the sounding signals as received by the respective BFE antenna 112(k). The CPU of the BFE 110 may further be able to ascertain—e.g., from time/phase delays—which part of the received signal $y_k$ originates from the BFR antenna 104(j). As a result, the CPU of the BFE 110 may be able to determine (box 208) an n×m feedback matrix H whose components $H_{jk}$ characterize signal propagation in the MIMO channel:

$$y_j = \sum_{k=1}^{m} H_{jk} x_k = w_j.$$

The time-dependent stochastic quantities $w_j$ may describe a noise present in the MIMO channel and, in some implementation, may be approximated as a white noise, Gaussian noise, Poissonian noise, telegraph noise, correlated noise, and so on. The CPU of the BFE 110 may be capable of factoring out the noise component $w_j$ and determine the elements (components) of the feedback matrix H. Determination of the feedback matrix may be performed using any approach that is in accordance with a specific wireless standard (e.g., IEEE 802.ac) that is being used currently, in some implementations. In some implementations, determining the feedback matrix H may be performed using conventional MIMO characterization techniques. The values of the channel sounding signals x may be retrieved (box 210) at this point. The values x may be standard values stored in a memory of BFE 110, or may be values prepared for a particular sounding session and communicated by the BFR 102 to the BFE 110 together with the sounding signals or via a separate (wireless or wired) communication. In some implementations, the operations described herein as performed by the CPU of the BFE 110 may be performed by a microprocessor of the BFE 110, a digital signal processor (DSP) of the BFE 101, an application-specific integrated circuit of the BFE 110, or other logic circuits of the BFE 110.

Figure 3A:
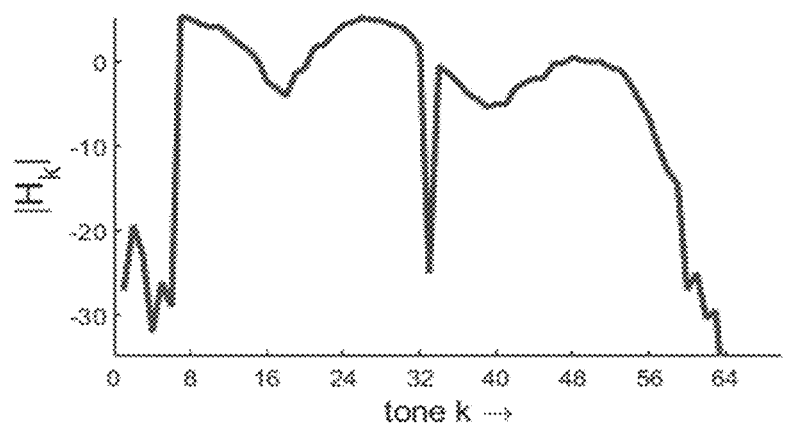
FIG. 3A illustrates, in one exemplary implementation, a frequency dependence of an element of the feedback matrix $H_{jk}(f)$ characterizing a given spatial stream for N=64 different tones.

The feedback matrix may be a frequency-dependent matrix H(f) determined for multiple (or all) tones f (frequency subcarriers) of the radio band used for the wireless communication. For example, the sounding signals x may be prepared and output by the BFR 102 for multiple (or all) of the tones of the radio band and a number of feedback matrices that is equal to the number of tones may be determined as described above. FIG. 3A illustrates, in one exemplary implementation, a frequency dependence of some element of the feedback matrix $H_{jk}(f)$ characterizing a given spatial stream (e.g., from the BFR antenna 104(k) to the BFE antenna 112(j)) for N=64 different tones (dBFS units are used for the vertical axis with the zero value corresponding to some reference value). As illustrated in FIG. 3A, the number of elements that have a large value (in the units used—close to the reference value of 0 dBFS) is comparable to the number of tones N, with only a few tones having notably smaller values. To obtain a more compact representation, the CPU of the BFE 110 may perform one of a number transformations to obtain a sparse representation of $H_{jk}$. A sparse representation may be defined as a representation in which a fraction of values that are smaller than some pre-determined threshold value is less than 50% (or 40%, 20%, 10%, or any other pre-determined value). In one implementation, the transformation may be a discrete Fourier transformation $H(f_s) \rightarrow H(\tau_p)$, such that $$H(\tau_p) = \sum_{s=0}^{N-1} e^{-2\pi i p s/N} H(f_s),$$

which amounts to a matrix multiplication of the row vector $H(f_s)$ and the matrix F of the exponential factors: $H(\tau) = F(\tau, f) \times H(f)$.

Figure 3B:
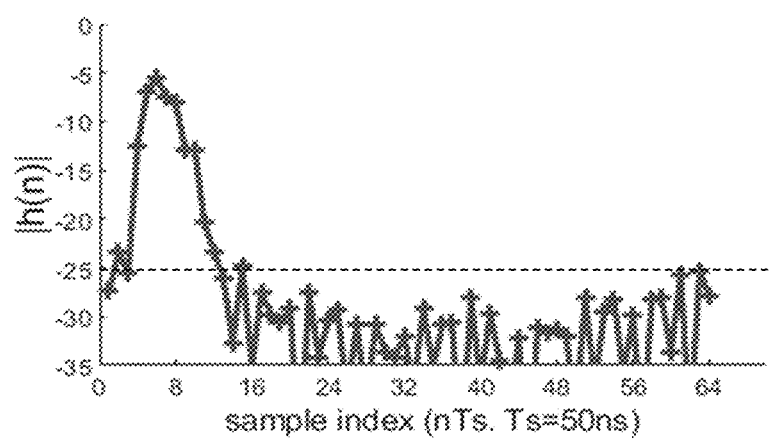
FIG. 3B illustrates, for the exemplary implementation of FIG. 3A, a sparse representation of the element of the feedback matrix $H_{jk}(f)$ obtained with the discrete Fourier transformation for N=64 different tones.

FIG. 3B illustrates, for the exemplary implementation of FIG. 3A, a sparse representation of the element of the feedback matrix $H_{jk}(f)$ obtained with the discrete Fourier transformation for N=64 different tones. As illustrated in FIG. 3B, the number of elements (parameters) in the new representation that are at or above −25 dBFS is 12. Therefore, the new representation is a sparse representation of the matrix element $H_{jk}$ as long as the pre-determined threshold value is set at 20%. In some implementations, the threshold value may be set in terms of absolute units (e.g., −25 dBFS, −30 dBFS) rather than as a percentage of all values in the sparse representation.

FIGS. 3A-B illustrate the general concept that can be extended to other aspects of handling of the MIMO sounding feedback. In some implementations, an additional Fourier transform may be performed with respect to a spatial variable that identifies a spatial stream. For example, the CPU of the BFE 110 may map the n×m feedback matrix H (or its Fourier representation with respect to the tone index) onto an n*m-long row vector h(l) by e.g., concatenating all rows of the feedback matrix $H_{jk}$, such that $$H_{jk} \rightarrow h(m*(j-1)+k).$$

In other implementations, it is the columns of the feedback matrix $H_{jk}$ that may be concatenated instead, to obtain an n*m-long column vector h(l). The CPU of the BFE 110 may next perform a discrete Fourier transformation of the concatenated vector $h(l_s) \rightarrow h(q_p)$ such that $$h(q_p) = \sum_{s=0}^{n*m-1} h(l_s) e^{-2\pi i p s/(n*m)},$$

which amounts to the matrix multiplication: h(q)=h(l)×F(l, q).

In some implementations both Fourier transformation described above may be implemented together, h(f,l)→h(τ, q)=F(τ,f)×h(f,l)×F(l,q), so that the two-dimensional (2D) discrete Fourier transformation is performed with respect to both the tone index f and the spatial stream index l. In some implementations, only one of the Fourier transformations may be implemented, e.g., only the Fourier transformation with respect to the spatial stream index l or the tone index f.

Figure 3C:
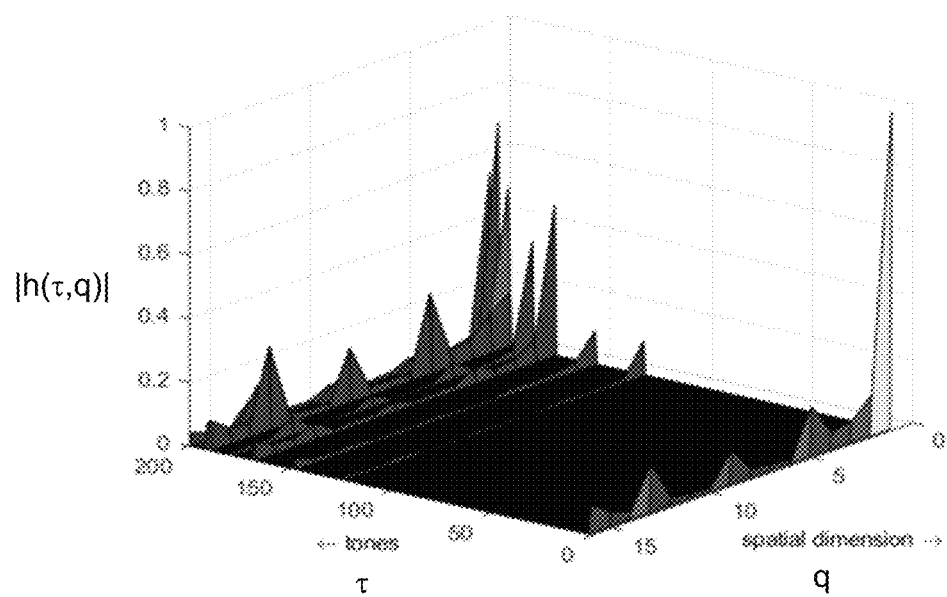
FIG. 3C illustrates an exemplary implementation of a 2D discrete Fourier transformation with respect to the tone index f and the spatial stream index l for a situation of N=200 tones and 16 spatial streams.
Figure 3D:
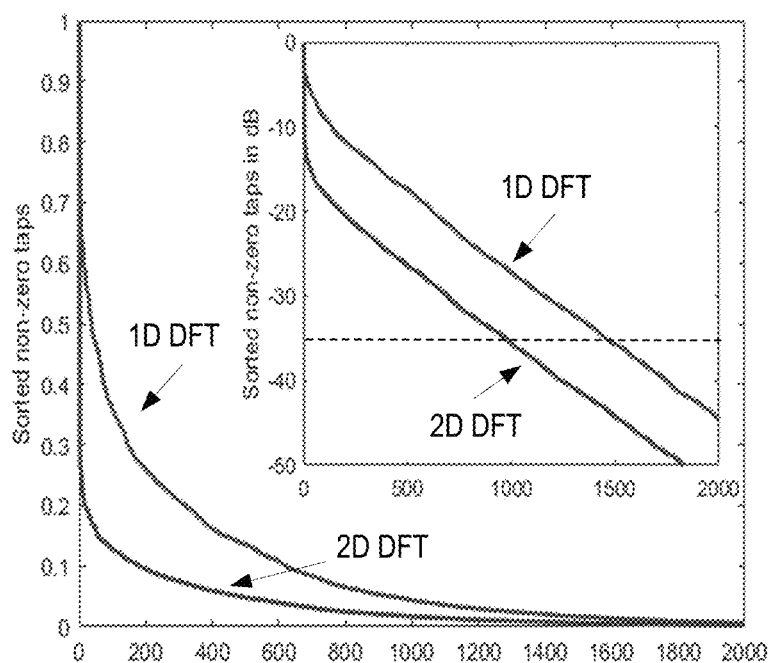
FIG. 3D illustrates a possible advantage of using a 2D discrete Fourier transformation for feedback parameters representation as compared to a one-dimensional (1D) Fourier transformation.

FIGS. 3C and 3D illustrate, for some exemplary implementation, an advantage of using the 2D Fourier transformation for a more efficient representation of the feedback parameters. More specifically, FIG. 3C illustrates an exemplary implementation of a 2D discrete Fourier transformation with respect to the tone index f and the spatial stream index l for a situation of N=200 tones and 16 spatial streams (e.g., 8 transmitting antennas and 2 receiving antennas). As illustrated in FIG. 3C, the obtained representation h(τ,q) of the feedback matrix $H_{jk}(f)$ is a sparse representation as the number of elements of h(τ,q) that depart significantly from zero is a small fraction of the total number of possible parameters, 200×16=32,000.

FIG. 3D illustrates a possible advantage of using a 2D discrete Fourier transformation for feedback parameters representation as compared to a one-dimensional (1D) Fourier transformation. The main plot in FIG. 3D features two curves, the upper curve corresponding to the 1D discrete Fourier transform (DFT) with respect to only the tone index f, whereas the lower curve corresponding to the 2D DFT with respect to both the tone index and the spatial stream index. (The inset shows the same data but plotted using the dBFS logarithmic scale.) The vertical axis shows normalized values (taps) of h(τ,q) in the decreasing order of the ordered values of h(τ,q). In the implementation illustrated, there are 8 BFR antennas and 4 BFE antennas (32 spatial streams), operating in a 80 MHz 802.11ax channel, for a total number of 32×936=29952 various frequency subcarrier and spatial stream values. As illustrated in FIG. 3D, when the 1D DFT is used, the number of values of h(τ,q) that are at or above −35 dBFS is approximately 1500. When the 2D DFT is used instead, the number of corresponding values drops to about 1000, in one illustrative non-limiting example.

With continuing reference to FIG. 2, as a result of application of the above-described 1D DFT, 2D DFT methods, or other similar methods, the CPU of the BFE 110 may obtain a sparse representation $\mathcal{H}$ of the feedback matrices H (box 212) for various tones f of the radio channel. The sparse representation $\mathcal{H}$ of the feedback matrices may be subsequently trimmed (block 214), $\mathcal{H} \rightarrow \underline{\mathcal{H}}$, by identifying and discarding those values of $\mathcal{H}$ that do not satisfy the threshold condition (e.g., are below the threshold value) and obtaining the trimmed representation $\underline{\mathcal{H}}$. Consequently, $\underline{\mathcal{H}}$ is a more compact representation compared with the starting representation H or the sparse representation $\mathcal{H}$. Because, by construction and on purpose, the sub-threshold elements are not simply replaced with zeros (this would leave the length of the representation intact), for proper handling, the trimmed representation $\underline{\mathcal{H}}$ may need to be accompanied with metadata indicating location of various elements of $\underline{\mathcal{H}}$ within the sparse representation $\mathcal{H}$. In some implementations, each of the elements of $\underline{\mathcal{H}}$ may be indexed by its locations (e.g., τ and q, if the 2D DFT is used). In some implementations, the locations may be indexed by specifying relative distance from other elements (e.g., Δτ and Δq counted from the preceding element of $\underline{\mathcal{H}}$).

In some implementations, other (than Fourier) transformations may be used, such as Laplace transformation, Mellin transformation, Hartley transformation, and the like. In some implementation, the BFE 110 may deploy a singular value decomposition (SVD) of the feedback matrices H. In the SVD method, the CPU of the BFE 110 may use standard methods of linear algebra to represent the n×m matrix H (separately, for each of the tones f), as a product of three matrices:

$$H = U \Lambda V^+$$

where Λ is a diagonal n×m matrix, U is an n×n square matrix, and V⁺ is an m×m square matrix. The BFE 110 may determine (box 212) the diagonal values $\lambda_j$ (eigenvalues, singular values) of the matrix Λ for 1≤j≤min(n, m), and the corresponding (to each j) n-component eigenvectors vectors $u_j$ and m-component vectors $v_j^+$ to represent the feedback matrix as the outer product, $$H = \sum_{j=1}^{min(n,m)} \lambda_j u_j v_j^+$$

Among the eigenvalues $\lambda_j$, there may multiple eigenvalues that are below a pre-determined threshold value. Therefore, the obtained representation may be a sparse representation $\mathcal{H}$. This representation may be trimmed (block 214), $\mathcal{H} \rightarrow \underline{\mathcal{H}}$, by discarding the sub-threshold eigenvalues (and associated with them eigenvectors $u_j$ and $v_j^+$).

The trimmed representation $\underline{\mathcal{H}}$ of MIMO feedback parameters (e.g., 1D DFT, a 2D DFT, an SVD, etc.) may be communicated by the BFE 110 to the BFR 102 (boxes 216-218). This communication may use any number of the BFE antennas 112 and BFR antennas 104. In some implementation, only a single BFE antenna and a single BFR antenna may be used. In some implementations, the communication of the trimmed representation may be performed over a wired BFE-BFR connection or a combination of wired and wireless connections.

In implementations involving SVD decomposition, communication of the retained eigenvalues $\lambda_j$ and associated with them eigenvectors, from BFE 110 to the BFR 102, may occur according to the standard MIMO protocol for the corresponding wireless standard. For example, in some implementations, the eigenvalues $\lambda_j$ may be transmitted first following by the corresponding eigenvectors. In some implementations, only eigenvectors $v_j^+$ may need to be transmitted because the BFR 102 may not need to perform a complete reconstruction of the feedback matrices H and may be capable of accomplishing beamforming without explicit knowledge of the eigenvectors $u_j$. (The eigenvectors $u_j$ may, subsequently, to be used by the BFE 110 to effectively process the beamformed signals output by the BFR 102). The eigenvectors $v_j^+$ to be transmitted to the BFR 102 may be parameterized using any known parameterization scheme, e.g., Givens angles.

Having received the sparse representation $\mathcal{H}$ from BFE 110, the BFR 102 may perform estimation of the original feedback matrix H (box 220). In some implementations—such as in the SVD approach—the BFR 102 may skip this operation and proceed with using the received eigenvalues and eigenvectors for beamforming (box 220) by ignoring the eigenvalues that have not been received. For example, the BFR 102 may assume that such eigenvalues are zeros.

In implementations where a Fourier transformation is being used (such as the 1D DFT with respect to the tone, 1D DFT with respect to the spatial streams, or 2D DFT with respect to both), the CPU of the BFR 102 may perform an inverse Fourier transform to determine the feedback matrices $H_{jk}(f)$. In some implementations, the inverse Fourier transformation may be performed by a microprocessor of the BFR 102, a digital signal processor of the BFR 102, an application-specific integrated circuit of the BFR 102, or other logic circuits of the BFR 102. In one implementation, the CPU of the BFR 102 may perform various operations previously performed by the CPU of the BFE 110 in the reverse order. For example, if the received set of the channel sounding feedback parameters is a trimmed representation $\mathcal{H}$ that was obtained by the BFE 110 using the 2D DFT method, the BFR 102 may first reconstruct the sparse representation $\mathcal{H}$ by padding the trimmed representation $\mathcal{H}$ with zeros based on the metadata information (locations of non-zero elements) communicated by the BFE 110. The sparse representation $\mathcal{H}$ obtained in this way, e.g., $h^{BFR}(\tau, q)$, may be different (as emphasized by the subscript "BFR" in its notation) from the corresponding 2D Fourier transform on the BFE side, $h(\tau,q)$, since the sub-threshold values $h(\tau,q)$ are replaced with zeros in $h^{BFR}(\tau,q)$. Nonetheless, $h^{BFR}(\tau,q)$ may provide a good approximation of $h(\tau,q)$, quite adequate for efficient beamforming on the BFR side. The BFR 102 may next perform an inverse 2D DFT (or an inverse 1D DFT, if only a single Fourier transform has been performed on the BFE side). As a result, a set of concatenated row vectors $h(f,l)$ (for each frequency tone f) may be determined: $h^{BFR}(\tau,q) \rightarrow h^{BFR}(f,l) = F^{-1}(f,\tau) \times h^{BFR}(\tau,q) \times F^{-1}(q,l)$, where the symbol $F^{-1}$ indicates the discrete inverse Fourier transform matrix. For example, for the transformation from the time domain back to the frequency domain this matrix may be determined by $$h(f) = F^{-1}(f, \tau) \times h(\tau);$$

$$h(f_s) = \frac{1}{N} \sum_{s=p}^{N-1} e^{\frac{2\pi i p s}{N}} h(\tau_p).$$

Finally, the BFR 102 may perform a de-concatenation operation to obtain, for each tone f, a set of matrix elements $h^{BFR}(f,l) \rightarrow H_{jk}^{BFR}(f)$. The feedback matrices $H_{jk}^{BFR}(f)$ may be used by the BFR 102 for beamforming (box 222) and efficient transmission of data packets to the BFE 110 in the same way that the feedback matrices $H_{jk}(f)$ are used in standard implementations of the conventional sounding feedback method.

The process of generation, communication, and unpacking the sparse sounding feedback described in relation to FIG. 2 may be repeated periodically after a pre-determined time has elapsed. In some implementations, the process may also be performed whenever it is detected that the quality of the data communication has deteriorated and that beamforming, based on the most recent feedback parameters, is no longer adequate to the changed network environment. The implementations described in relation to FIG. 2 have the base station as the beamformer and the client device as the beamformee. However, channel sounding (and subsequent data packet transmission) may also be performed in the inverse direction where the client device outputs the sounding signals and the base station determines and communicates to the client device the channel feedback parameters. Likewise, the processes described may occur between any two client devices (or any two base stations, in the implementations with multiple base stations).

Given a variety of sparse representations that the feedback parameters may have in various implementations of the present disclosure, the BFR 102 and the BFE may have to be in agreement regarding which format is being used in a particular channel sounding session, e.g., the sparse SVD representation, the sparse 2D DFT, the sparse 1D DFT, and so on. Accordingly, in some implementations, the format may be static and specified in the wireless standard used (e.g., via a modification to an existing standard or development of a new standard). In some implementations, the format may be dynamic and the representation to be used may be specified by one of the parties to the sounding process. For example, the BFR 102 may indicate the format to be used (e.g., the 2D DFT), using a dedicated frame, during the initial transmission of the sounding signals $x_k$. In another implementation, the BFE 110 may specify the format, e.g., using a dedicated frame, during transmission of the feedback parameters (blocks 216-218).

Figure 4:
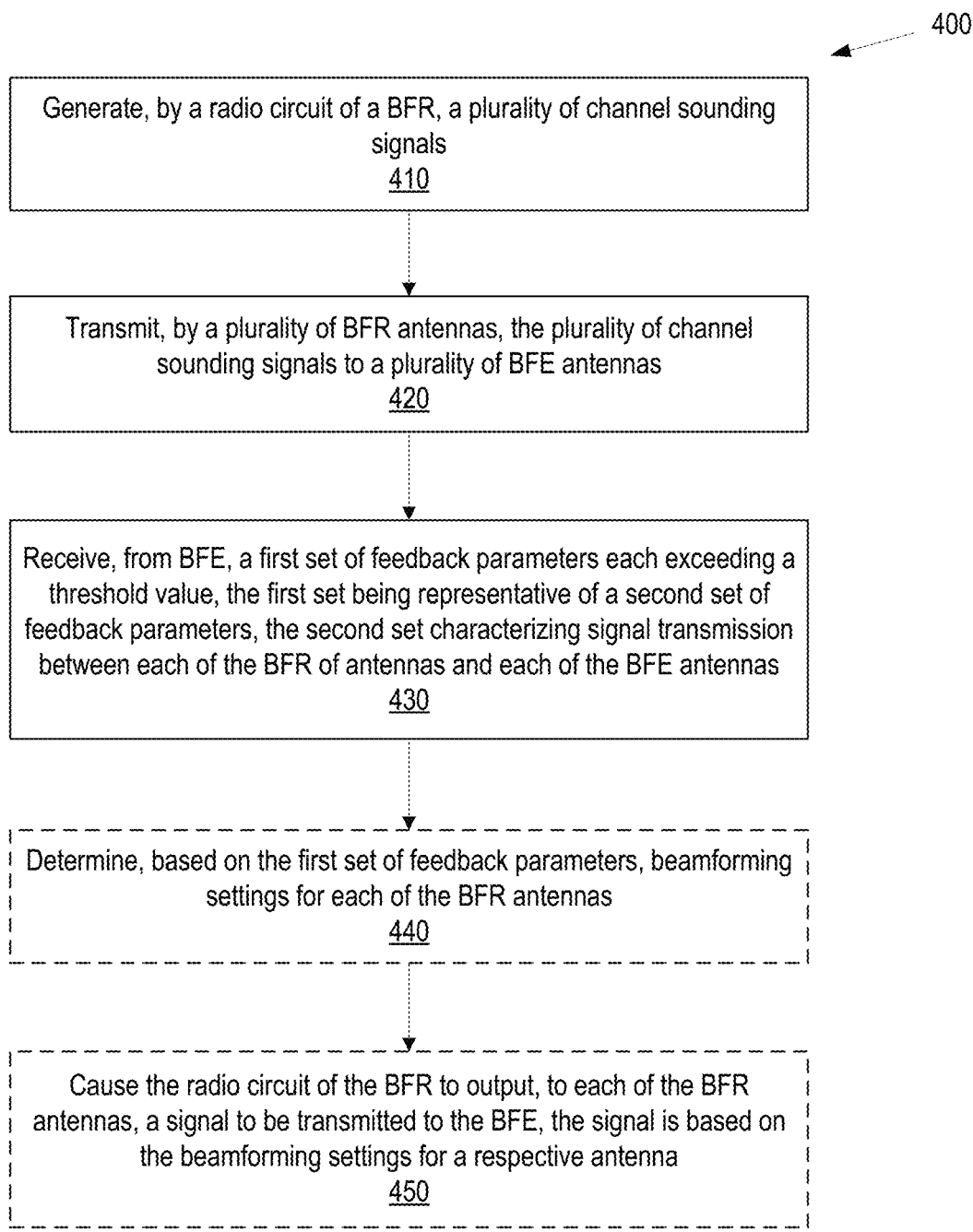
FIG. 4 is a flow diagram of an example method of obtaining, by a base station (beamformer) device, an efficient channel state information of a MIMO channel supporting a wireless connection between the base station and a client device (beamformee), in accordance with some implementations of the present disclosure.
Figure 6:
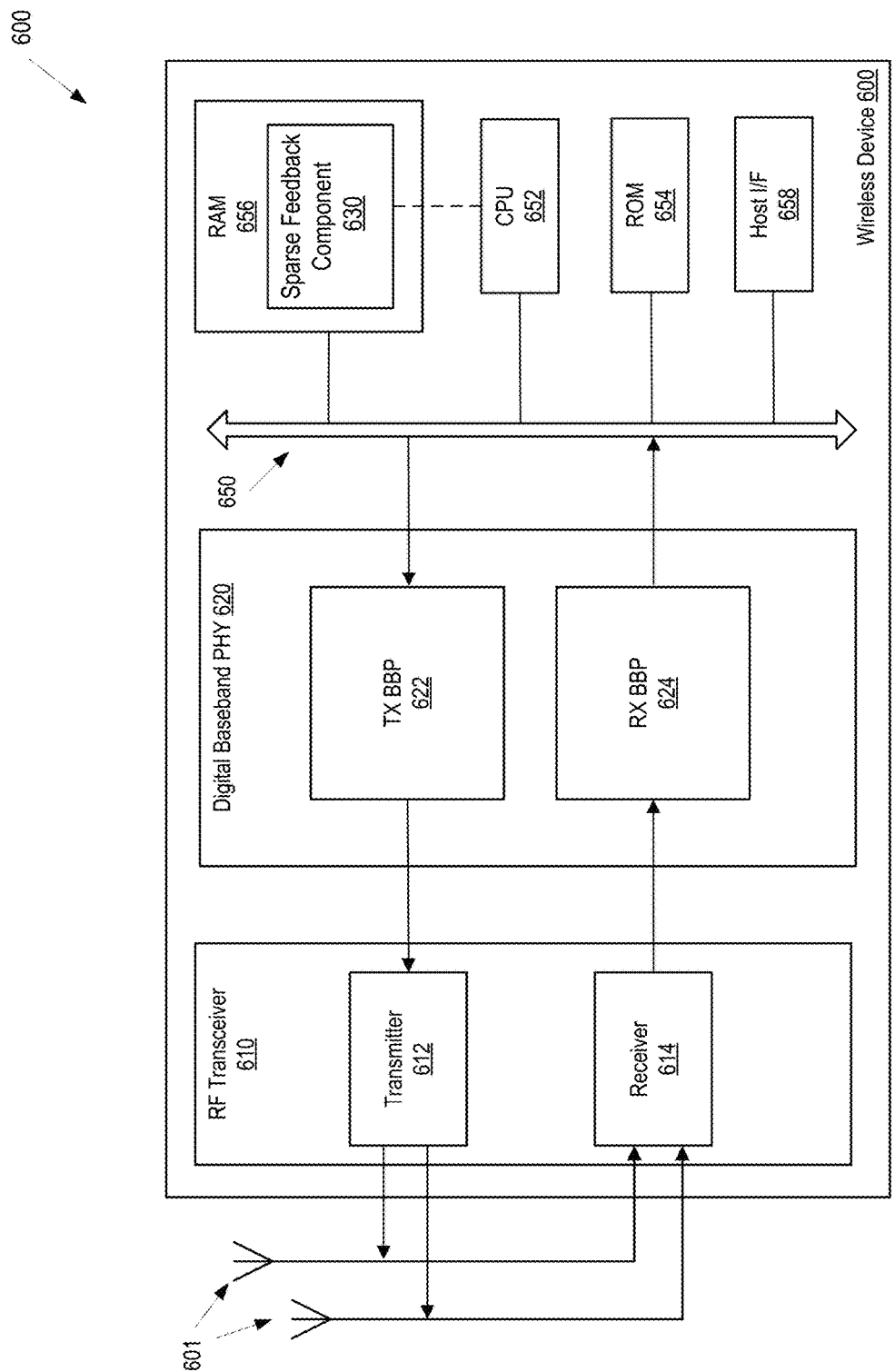
FIG. 6 illustrates an example wireless device that is configured in accordance with the techniques described herein.

FIG. 4 is a flow diagram of an example method 400 of obtaining, by a base station (beamformer) device, an efficient channel state information of a MIMO channel supporting a wireless connection between the base station and a client device (beamformee), in accordance with some implementations of the present disclosure. The base station may be an access point of the wireless network 100, which may further include additional client devices. To perform method 400, the beamformer device (BFR) may use such a hardware as is illustrated in FIG. 6. Method 400 may be performed by a processing logic (e.g., a CPU, a microcontroller, a digital signal processor, or a dedicated application-specific integrated circuit, or any other processing device) of the BFR 102 that may include hardware (e.g., circuitry, dedicated logic, programmable logic, microcode, etc.), software (such as operations performed by the sparse feedback analyzer 106 and the beamforming module 107), firmware or a combination thereof.

The method 400 may include the BFR generating, by its radio circuit (e.g., radio frequency (RF) transceiver), a plurality of channel sounding signals (block 410). The BFR may have a first plurality of antennas associated with the BFR. The first plurality of antennas may be integrated with the radio circuit of the BFR, in some implementations. In other implementations, the first plurality of antennas may be a separate component in communication with the radio circuit of the BFR. The radio circuit may include a radio front end, high frequency amplifiers, intermediate frequency amplifiers, digital-to-analog and analog-to-digital convertors, and the like.

The method 400 may continue with transmitting, by the first plurality of antennas, the plurality of generated channel sounding signals to a second plurality of antennas (block 420). The second plurality of antennas may be associated with the client beamformee device, such as the BFE 110. The transmission may be over a radio frequency band having a plurality of frequency subcarriers (tones), as described in relation to FIG. 2. The plurality of channel sounding signals may be processed by the BFE in accordance with the description of FIG. 2 above and FIG. 5 below.

The BFE may transmit, back to the BFR, a first set of feedback parameters and the method 400 may continue with receiving the first set (block 430). The first set may be prepared by the BFE so that all feedback parameters in the first set exceed a threshold value. The first set of feedback parameters may be representative of a second set of feedback parameters and may be derived from the second set, e.g., by trimming the second set (discarding all parameters of the second set that are below a threshold value). The second set of feedback parameters may characterize signal transmission between each of the first plurality of antennas and each of the second plurality of antennas. The second set may describe signal transmission in a more detailed and/or precise way (than the first set) and may include more parameters than the first set, but, unlike the first set, the second set may remain with the BFE whereas the first set is communicated to the BFR.

The type of feedback parameters in the first set (and the second) set may depend on the particular method used for channel sounding by the wireless network. The specific method may be a standard method or a session-specific method. In one implementation, where a discrete 2D Fourier transform is used, the feedback parameters of the second set may include all Fourier components of the feedback matrices (with respect to both the frequency subcarrier index and a spatial stream index), as described in relation to FIG. 2. Correspondingly, the first set may include all the Fourier components that exceed a threshold value. In another implementation, where a singular value decomposition method is being used, the feedback parameters of the second set may include all eigenvalues of the feedback matrices, as described in relation to FIG. 2. Correspondingly, the first set may include all the eigenvalues that exceed a threshold value. In addition to the first set, which includes the eigenvalues, the BFE may also transmit (and the BFR may receive) the eigenvectors that correspond to the eigenvalues of the first set.

The first set (and the second set) of feedback parameters may include a plurality of subsets such that each of the subsets corresponds to one of a plurality of frequency subcarriers. The subsets may be indexed by a first index indicating a frequency subcarrier. For example, in the singular value decomposition method, the first set may include multiple subsets of eigenvalues, each subset corresponding to a particular frequency subcarrier (tone). In the discrete Fourier transform method, each subset may include a representation of elements of the feedback matrices. A representation may be a result of a transformation that increases sparsity of the elements of feedback matrices, such as the discreet Fourier transform, in one implementation. In one exemplary implementation, the transformation may be a transformation to an eigenvector representation of the spatial co-variance matrix. The chosen representation of the feedback matrices may be indexed by a second (spatial) index, indicating transmission paths between transmitting and receiving antennas.

The method 400 may optionally continue with the BFR determining, based on the first set of feedback parameters, beamforming settings for each of the plurality of BFR antennas (block 440). For example, in one implementation, where a discrete 2D Fourier transform is used, the BFR may pad the feedback parameters of the first set with additional zeros in appropriate locations so that the padded first set is expanded to the size of the second set. The appropriate locations for zeros (as well as the correct locations for non-zero feedback parameters) may be included in metadata for the first set. The metadata may be communicated to the BFR together with the first set or in a separate communication. After padding the first set of feedback parameters, the BFR may perform an inverse 2D Fourier transformation to obtain the feedback matrices H for some or all of the tones and spatial streams.

The method 400 may continue with the BFR preparing a data communication stream (e.g., one or more packets of data) to be transmitted to the BFE client device (block 450). In particular, a logic circuit (e.g., CPU, microprocessor, a digital signal processor, application-specific integrated circuit, and the like) of the BFE may compute beamforming settings, for each of the BFR antennas, to achieve the maximum wireless efficiency (e.g., a maximum beam intensity in the direction of the BFE client device) of data transmission. The beamforming settings for each antenna may include a representation of an amplitude and a representation of a phase of the signal to be transmitted by the respective antenna. In some implementations, the representations of the amplitude and phase may be some digital values, such that after these digital values are processed by a digital-to-audio converter and a radio circuit, they cause the respective antenna to transmit a desired signal.

In one implementation, where a singular value decomposition method is being used, the BFR may access the eigenvalues $\lambda_j$ of the first set and further access the corresponding eigenvectors $v_j^+$ that may be communicated to the BFR together with the first set or in a separate communication. The BFR may treat the missing eigenvalues as zeros and determine the beamforming settings for each of the BFR antennas. In some implementations, the beamforming settings may be determined in a conventional way in accordance with the wireless standard being used.

Figure 5:
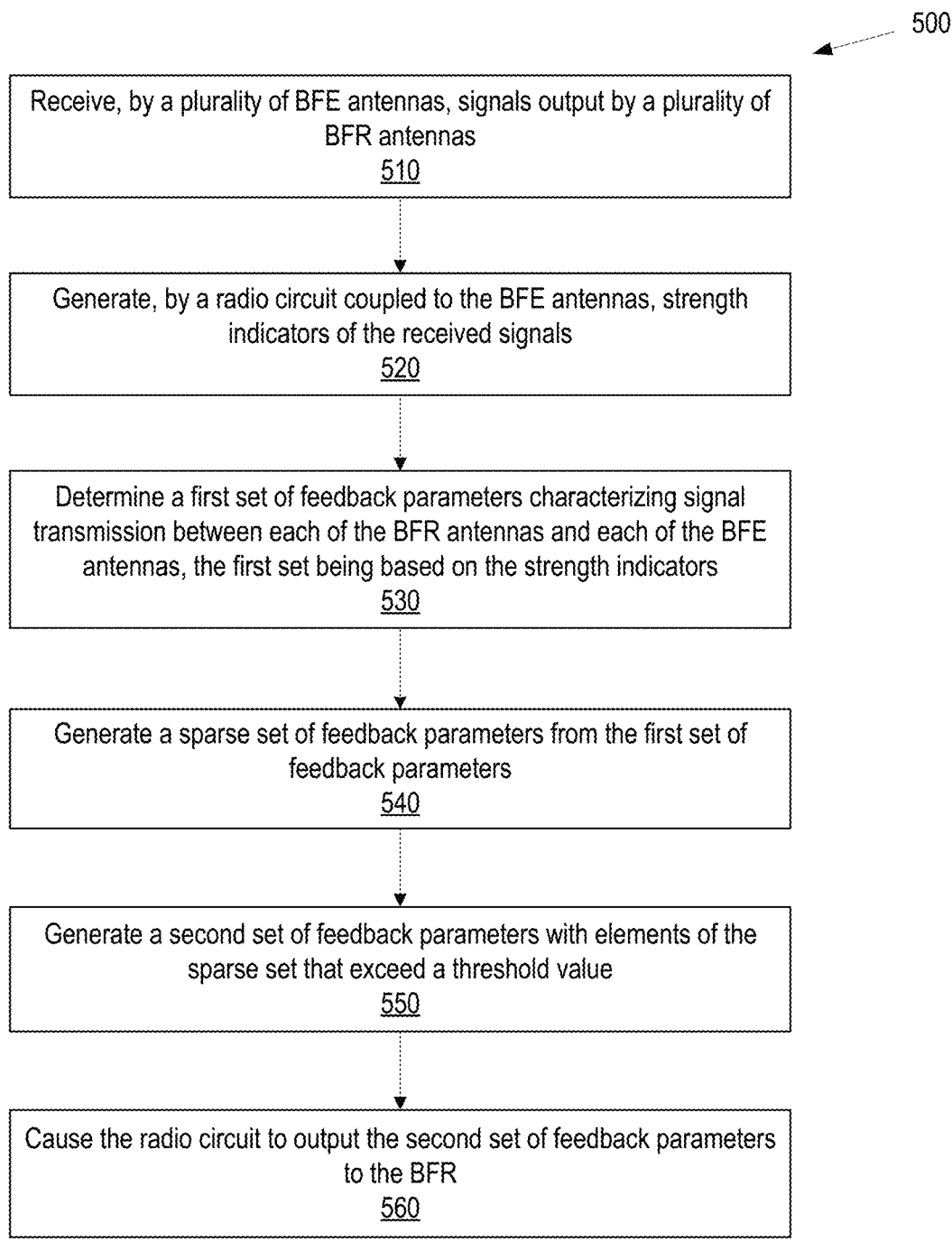
FIG. 5 is a flow diagram of an example method of generating, by a base client device, an efficient channel state information of a MIMO channel supporting a wireless connection between a base station) and the client device, in accordance with some implementations of the present disclosure.

FIG. 5 is a flow diagram of an example method 500 of generating, by a base client device, an efficient channel state information of a MIMO channel used to support a wireless connection between a base station and the client device, in accordance with some implementations of the present disclosure. The wireless network may be the wireless network 100. To perform method 500, the beamformee device (BFE) may use such a hardware as is illustrated in FIG. 6. Method 500 may be performed by a processing logic of the BFE 110 that may include hardware (e.g., circuitry, dedicated logic, programmable logic, microcode, etc.), software (such as operations performed by the sparse feedback analyzer 106 and the beamforming module 107), firmware or a combination thereof.

The method 500 may include receiving, by a plurality of BFE antennas, signals output by a plurality of BFR antennas (block 510). A radio circuit (e.g., an RF transceiver) of the BFE, coupled to the plurality of BFE antennas, may process the received signals. The radio circuit of the BFE may include a radio front end, high frequency amplifiers, intermediate frequency amplifiers, digital-to-analog and analog-to-digital convertors, and the like. The radio circuit may determine the strength of the received signals and may generate corresponding strength indicators (block 520). The strength indicators may initially be in an analog format but may be converted to a digital format accessible to a logic circuit of the BFE (e.g., a CPU, a microcontroller, DSP, or any other processing device) of the BFE, the logic circuit being coupled to the radio circuit.

The method 500 may continue with determining, by the CPU of the BFE, based on the strength indicators, a first set of feedback parameters characterizing signal transmission between each of the plurality of BFR antennas and each of the plurality of BFE antennas (block 530). In some implementations, the CPU of the BFE may be executing instructions of the sparse feedback module 114. The first set of feedback parameters of method 500 may be the same as the second set of feedback parameters of method 400, in one implementation. The first set of feedback parameters of method 500 may include matrices H determined for multiple frequency subcarriers of the wireless band.

The method 500 may continue with generating, by the CPU of the BFE, a sparse set of feedback parameters from the first set of feedback parameters (block 540). In some implementations, the sparse set may be generated using a 1D or a 2D discrete Fourier transformation. In other implementations, the sparse set may be generated by a singular value decomposition method. The sparse set may be a set in which no more than 50% (or 30%, 25%, 10%, etc.) of elements exceed a threshold value. From the sparse set, the CPU of the BFE may generate a second set of feedback parameters with elements of the sparse set that exceed the threshold value (block 550). For example, the CPU of the BFE may discard all the sub-threshold Fourier components of the sparse set. In another example, if the singular value decomposition method is being used, the CPU of the BFE may discard all the sub-threshold eigenvalues of the sparse set.

The method 500 may continue with the CPU of the BFE causing the radio circuit to output the second set of feedback parameters to the BFR. The second set of feedback parameters of the method 500 may be the same as the first set of feedback parameters of the method 400. In implementations, where the singular value decomposition method is used, the radio circuit may additionally output the eigenvectors $v_j^+$ associated with the eigenvalues $\lambda_j$ of the second set.

The techniques for generation, delivery, and usage of the optimized channel-sounding feedback described herein may be implemented on various types of portable wireless devices that contain wi-fi chipsets. FIG. 6 illustrates an example wireless device that is configured in accordance with the techniques described herein. In the embodiment illustrated in FIG. 6, wireless device 600 may be a single-chip integrated circuit (IC) device manufactured on a semiconductor die or a single-chip IC that is manufactured as a System-on-Chip (SoC). In other embodiments, wireless device 600 may be a multi-chip module encapsulated in a single semiconductor package. Thus, wireless device 600 in FIG. 6 is to be regarded in an illustrative rather than a restrictive sense.

Wireless device 600 includes CPU 652, read-only memory (ROM) 654, random access memory (RAM) 656, host interface 658, digital baseband PHY 620, and RF transceiver (e.g., a radio circuit) 610. CPU 652, ROM 654, RAM 656, host interface 658, and digital baseband PHY 620 are coupled to one or more buses 650. Digital baseband PHY 620 is also coupled to RF transceiver 610, which is coupled to a plurality of antennas 601. In some embodiments, the antenna may be integrally formed or incorporated on the same IC chip with the rest of the components of wireless device 600 or may be disposed on a separate chip or substrate. Alternatively, the antenna may be separately connected to a printed circuit board (PCB) to which wireless device 600 is mounted or attached.

CPU 652 includes one or more processing cores configured to execute instructions that may be stored in ROM 654, RAM 656, or flash memory (not shown). ROM 654 is read-only memory (or other suitable storage medium) that is configured for storing boot-up routines, configuration parameters, and other firmware parameters and settings. RAM 656 is volatile memory that is configured for storing data and firmware instructions accessed by CPU 652. A flash memory, if present, may be embedded or external non-volatile memory (e.g., NAND flash, NOR flash, etc.) that is configured for storing data, programs, and/or other firmware instructions.

Host interface 658 may include control registers, data registers, and other circuitry configured to transfer data between digital baseband PHY 620 and a host (not shown). The host may be a microcontroller subsystem disposed on-chip or may be an off-chip IC device. The host may include its own CPU that is operable to execute host applications or other firmware/software configured (among other functions) to receive and process quality indicators in accordance with the techniques described herein.

Bus(es) 650 may include one or more buses such as a system interconnect and a peripheral interconnect. The system interconnect may be a single-level or multi-level Advanced High-Performance Bus (AHB) that is configured as an interface that couples CPU 652 to the other components of wireless device 600, as well as a data and control interface between the various components and the peripheral interconnect. The peripheral interconnect may be an Advanced eXtensible Interface (AXI) bus that provides the primary data and control interface between CPU 652 and its peripherals and other resources (e.g., system resources, input/output (I/O) blocks, direct memory access (DMA) controllers, etc.), which may be programmed to transfer data between peripheral blocks without burdening the CPU.

Digital baseband PHY (e.g., such as a digital signal processor, DSP) 620 includes various logic blocks and circuitry configured to process signals and data that are transferred between RF transceiver 610 and various components coupled to the one or more buses 650. Digital baseband PHY 620 includes transmitting TX BBP 622 and receiving RX BBP 624. TX BBP 622 includes circuitry configured to receive digital data (e.g., a series of bytes) from other components in wireless device 600 and to convert the received data into a modulated digital signal that is send to RF transceiver 610. RX BBP 624 includes circuitry configured to receive a modulated digital signal from RF transceiver 610 and to convert the received signal into digital data.

RF transceiver 610 includes various logic blocks and circuitry configured to process signals that are transferred between digital baseband PHY 620 and antenna(s) 601. RF transceiver 610 includes transmitter circuitry 612 and receiver circuitry 614. Transmitter circuitry 612 includes digital-to-analog converters (DACs) and other circuitry configured to receive a modulated digital signal from TX BBP 622 and convert it to an analog RF signal for transmission through antenna(s) 601. Receiver circuitry 614 includes analog-to-digital converters (ADCs) and other circuitry configured to receive an analog RF signal from antenna(s) 601 and to convert it to a modulated digital signal that is sent to RX BBP 624.

In operation on the transmitter path, TX BBP 622 receives a series of data bytes from a component (e.g., CPU 652, host interface 658, etc.) through the one more buses 650. TX BBP 622 converts the received bytes of data into packets with preambles and tail-end CRCs, scrambles the packets, and serializes the scrambled packets into a stream of data bits. TX BBP 622 then phase-modulates the stream of data bits into a cosine (I) and sine (Q) portions of a modulated signal, and the modulated signal is sent to transmitter circuitry 612. Transmitter circuitry 612 uses DACs to convert the I and Q portions of the modulated signal into analog signals, combines the analog signals into an RF signal, and transmits the RF signal through antenna(s) 601.

In operation on the receiver path, receiver circuitry 614 receives an RF signal from antenna(s) 601, uses ADCs to convert the received RF signal into an I and Q portions of a modulated digital signal, and sends the modulated signal to RX BBP 624. RX BBP 624 recovers/tracks the timing intervals and the relative phases of the modulated signal and uses this timing information to demodulate the received signal into a stream of bits. RX BBP 624 then de-serializes the stream of bits, reassembles the bits into packets, and descrambles the packets. Any payload data in the packets is then converted into a series of bytes that is sent to a component (e.g., CPU 652, host interface 658, etc.) through the one or more buses 650.

In accordance with the techniques described herein, the wireless device may include a sparse feedback component 630, which may be implemented in software, hardware, or firmware, or any combination thereof. The sparse feedback component 630 may be stored in ROM 654 and/or RAM 656. In some implementations, some modules of the sparse feedback component 630 may be stored in ROM 654 whereas other modules may be stored in RAM 656, e.g., during a boot operation. The sparse feedback component 630 may combine functionality of the sparse feedback analyzer 106 and the sparse feedback module 114 illustrated in FIG. 1. For example, when the wireless device 600 is operating as a beamformer, the sparse feedback component 630 may provide functionality of the sparse feedback analyzer 106, such as receiving channel feedback information and transforming the received information into a format usable for the beamforming module 107. When the wireless device 600 is operating as a beamformee, the sparse feedback component 630 may provide functionality of the sparse feedback module 114, such as determining elements of the feedback matrices, obtaining a sparse representation of the feedback matrices (e.g., performing discrete Fourier transformations and/or singular value decomposition operations), trimming the obtained sparse set, and so on.

In operation, the sparse feedback component 630 outputs instructions to the CPU 652. When the wireless device 600 is operating as a beamformer, the sparse feedback component 630 may be in communication with the RX BBP 624 to receive a first set of feedback parameters of method 400 from the beamformee device via antennas 601. When the wireless device 600 is operating as a beamformee, the sparse feedback component 630 may be in communication with the TX BBP 622 to output, to the beamformer device, a second set of feedback parameters of method 500.

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A beamformee device comprising:
   a plurality of antennas, wherein each of the plurality of antennas is to receive radio frequency (RF) signals;
   a radio circuit coupled to the plurality of antennas, the radio circuit to generate strength indicators of the received RF signals; and
   a processor coupled to the radio circuit, the processor configured to:
   determine, based on the strength indicators, a first set of feedback parameters characterizing signal transmission received by each of plurality of antennas;
   generate a sparse set of feedback parameters from the first set of feedback parameters;
   generate a second set of feedback parameters with elements of the sparse set that exceed a threshold value; and
   cause the radio circuit to transmit the second set of feedback parameters.

2. The beamformee device of claim 1, wherein the sparse set of feedback parameters is a set in which no more than 50 percent of elements exceed the threshold value.

3. The beamformee device of claim 1, wherein the first set of feedback parameters comprises a plurality of feedback matrices, each of the plurality of feedback matrices corresponding to one of a plurality of frequency subcarriers, and wherein elements of each of the feedback matrices characterize the signal transmission received by one of the plurality of antennas.

4. The beamformee device of claim 3, wherein the first set of feedback parameters is indexed by a first index and a second index, wherein the first index is to identify a feedback matrix by a corresponding one of the plurality of frequency subcarriers, and the second index is to identify an element of the feedback matrix, and wherein to obtain the sparse set of feedback parameters, the processor is to perform a first discrete Fourier transform with respect to the first index.

5. The beamformee device of claim 4, wherein the processor is further to perform a second discrete Fourier transform with respect to the second index.

6. The beamformee device of claim 3, wherein the sparse set of feedback parameters comprises, for each of the plurality of feedback matrices, a set of eigenvalues of a respective feedback matrix, and wherein:
to generate the sparse set of feedback parameters, the processor is to apply a singular value decomposition operation to each of the plurality of feedback matrices.

7. The beamformee device of claim 6, wherein the processor is further to cause the radio circuit to transmit, for each of eigenvalues of the second set, a corresponding eigenvector.

8. A beamformer device comprising:
a radio circuit to generate a plurality of channel sounding signals; and
a plurality of antennas, coupled to the radio circuit, to:
transmit the plurality of channel sounding signals; and
receive a first set of feedback parameters, each of the first set of feedback parameters exceeding a threshold value, wherein the first set of feedback parameters is representative of a second set of feedback parameters, wherein the second set of feedback parameters characterize signal transmission for each of the plurality of antennas, and wherein the first set of feedback parameters comprises a plurality of subsets of feedback parameters, wherein each one of the subsets of feedback parameters corresponds to one of a plurality of frequency subcarriers.

9. The beamformer device of claim 8, further comprising a processor coupled to the radio circuit, the processor to:
determine, based on the first set of feedback parameters, beamforming settings for each of the plurality of antennas; and
cause the radio circuit to output, to each of the plurality of antennas, a signal to be transmitted based on the beamforming settings for the respective antenna of the plurality of antennas.

10. The beamformer device of claim 9, wherein the beamforming settings for each of the plurality of antennas comprise a representation of an amplitude and a representation of a phase of the signal to be transmitted by the respective antenna.

11. A method comprising:
generating, by a radio circuit of a beamformer device, a plurality of channel sounding signals;
transmitting, by a plurality of antennas coupled to the radio circuit, the plurality of channel sounding signals; and
receiving a first set of feedback parameters, each of the first set of feedback parameters exceeding a threshold value, wherein the first set of feedback parameters is representative of a second set of feedback parameters, wherein the second set of feedback parameters characterizes signal transmission for each of the plurality of antennas, and wherein the first set of feedback parameters comprises a plurality of subsets of feedback parameters, wherein each one of the subsets of feedback parameters corresponds to one of a plurality of frequency subcarriers.

12. The beamformer device of claim 8, wherein the second set of feedback parameters comprises a plurality of feedback matrices, each of the plurality of feedback matrices corresponding to a respective one of the plurality of subsets of feedback parameters of the first set, wherein elements of each of the feedback matrices characterize the signal transmission to one of the plurality of antennas.

13. The beamformer device of claim 12, wherein the first set of feedback parameters is derived from a sparse set of feedback parameters by eliminating parameters of the sparse set that are smaller than the threshold value, and wherein the sparse set is derived from the plurality of feedback matrices by using a first transformation with respect to a first index and a second transformation with respect to a second index, the first index identifying an element of a feedback matrix, and the second index identifying the feedback matrix by a corresponding one of the plurality of frequency subcarriers.

14. The beamformer device of claim 12, wherein the first set of feedback parameters is derived from a sparse set of feedback parameters, the sparse set comprising, for each of the plurality of feedback matrices, eigenvalues of a respective feedback matrix, wherein the eigenvalues are obtained by singular value decomposition of the respective feedback matrix.

15. The method of claim 11, further comprising:
determining, by a processor, based on the first set of feedback parameters, beamforming settings for each of the plurality of antennas; and
causing the radio circuit to output, to each of the plurality of antennas, a signal to be transmitted based on the beamforming settings for the respective antenna of the plurality of antennas.

16. The method of claim 11, wherein the second set of feedback parameters comprises a plurality of feedback matrices, each of the plurality of feedback matrices corresponding to a respective one of the plurality of subsets of feedback parameters of the first set, wherein elements of each of the feedback matrices characterize the signal transmission to one of the plurality of antennas.

17. The method of claim 16, wherein the first set of feedback parameters is derived from a sparse set of feedback parameters by eliminating parameters of the sparse set that are smaller than the threshold value, and wherein the sparse set of parameters is derived from the plurality of feedback matrices by using a first transformation with respect to a first index and a second transformation with respect to a second index, the first index identifying an element of a feedback matrix, and the second index identifying the feedback matrix by a corresponding one of the plurality of frequency subcarriers.

18. The beamformer device of claim 16, wherein the first set of feedback parameters is derived from a sparse set of feedback parameters, the sparse set of feedback parameters comprising, for each of the plurality of feedback matrices, eigenvalues of a respective feedback matrix, wherein the eigenvalues are obtained by singular value decomposition of the respective feedback matrix; and wherein the method further comprises:
- receiving, from the beamformee device, for each of the eigenvalues, a corresponding eigenvector.

19. A method comprising:
- receiving, by a plurality of antennas of a beamformee device, radio frequency (RF) signals;
- generating, by a radio circuit coupled to the plurality of antennas, strength indicators of the received RF signals;
- determining, by a processor coupled to the radio circuit, a first set of feedback parameters characterizing signal transmission received by each of the plurality of antennas, wherein the first set of feedback parameters is based on the strength indicators;
- generating, by the processor, a sparse set of feedback parameters from the first set of feedback parameters;
- generating, by the processor, a second set of feedback parameters with elements of the sparse set that exceed a threshold value; and
- causing, by the processor, the radio circuit to transmit the second set of feedback parameters.

20. The method of claim 19, wherein the sparse set of feedback parameters is a set in which no more than 50 percent of elements exceed the threshold value.

* * * * *